United States Patent
Gnasienco (10) Patent No.: US 9,279,558 B2
(45) Date of Patent: Mar. 8, 2016

(54) LUMINAIRE LENS ASSEMBLY HAVING A THERMAL COMPENSATION UNIT AND METHOD THEREOF

(75) Inventor: Radu Gnasienco, Coquitlam (CA)

(73) Assignee: KONINKLIJKE PHILIPS N.V., Eindhoven (NL)

(*) Notice: Subject to any disclaimer, the term of this patent is extended or adjusted under 35 U.S.C. 154(b) by 20 days.

(21) Appl. No.: 14/006,423

(22) PCT Filed: Mar. 20, 2012

(86) PCT No.: PCT/IB2012/051326
§ 371 (c)(1),
(2), (4) Date: Sep. 20, 2013

(87) PCT Pub. No.: WO2012/131534
PCT Pub. Date: Oct. 4, 2012

(65) Prior Publication Data
US 2014/0009927 A1  Jan. 9, 2014

Related U.S. Application Data

(60) Provisional application No. 61/467,409, filed on Mar. 25, 2011.

(51) Int. Cl.
*F21S 4/00* (2006.01)
*F21V 5/00* (2015.01)
*F21V 3/00* (2015.01)
*F21V 3/02* (2006.01)
*F21V 15/01* (2006.01)
*G02B 7/02* (2006.01)
*F21S 8/00* (2006.01)
*F21S 8/02* (2006.01)

(Continued)

(52) U.S. Cl.
CPC . *F21V 5/007* (2013.01); *F21S 8/00* (2013.01); *F21V 3/00* (2013.01); *F21V 3/02* (2013.01); *F21V 15/01* (2013.01); *G02B 7/028* (2013.01); *F21S 8/02* (2013.01); *F21S 8/06* (2013.01); *F21Y 2103/00* (2013.01)

(58) Field of Classification Search
CPC ..... F21V 15/012; F21V 15/015; F21V 5/007; F21V 3/02; F21V 15/01; F21S 8/00; F21S 8/06; F21S 8/02; G02B 7/028; F21Y 2103/00
USPC .......................................................... 362/244
See application file for complete search history.

(56) References Cited

U.S. PATENT DOCUMENTS 5,309,335 A * 5/1994 Tryon .......................... 362/152
5,823,665 A    10/1998 Braun
(Continued)

FOREIGN PATENT DOCUMENTS

CN  1339664 A    3/2002
DE  10056966 A1  5/2002

*Primary Examiner* — Anh Mai
*Assistant Examiner* — Matthew Peerce
(74) *Attorney, Agent, or Firm* — Meenakshy Chakravorty (57) ABSTRACT

A luminaire (10) comprises at least one elongate luminaire housing (16), a plurality of lens segments (22, 24, 26, 28) extending through the at least one elongate luminaire housing, the lens segments having at least one edge which is cut on an angle, wherein an adjacent edge of adjacent lens segments form supplementary angles, at least one end constraint at ends of the plurality of elongate lens segments, at least one temperature compensation unit (50) disposed between ends of the plurality of elongate lens segments.

19 Claims, 8 Drawing Sheets

(51) Int. Cl.
*F21S 8/06* (2006.01)
*F21Y 103/00* (2006.01)

(56) References Cited

U.S. PATENT DOCUMENTS

| | | | |
|---|---|---|---|
| 6,561,690 B2 * | 5/2003 | Balestriero | F21S 4/008 257/E25.02 |
| 6,733,164 B1 * | 5/2004 | Smith, Jr. | B60Q 1/302 362/237 |
| 6,882,111 B2 * | 4/2005 | Kan et al. | 315/122 |
| 7,088,904 B2 * | 8/2006 | Ryan, Jr. | G09F 13/22 257/99 |
| 7,470,055 B2 * | 12/2008 | Hacker | F21S 2/005 362/225 |
| 7,758,207 B1 * | 7/2010 | Zhou | F21S 8/06 362/217.1 |
| 8,220,980 B2 * | 7/2012 | Gingrich, III | 362/612 |
| 8,746,933 B2 * | 6/2014 | Cho | F21S 2/005 362/235 |
| 8,901,823 B2 * | 12/2014 | Scapa et al. | 315/131 |
| 2002/0114155 A1 * | 8/2002 | Katogi et al. | 362/219 |
| 2005/0213328 A1 * | 9/2005 | Matheson | 362/267 |
| 2007/0097529 A1 | 5/2007 | Weber et al. | |
| 2010/0135020 A1 * | 6/2010 | Moore | A47F 11/10 362/249.02 |
| 2014/0140074 A1 * | 5/2014 | Chen et al. | 362/373 |
| 2015/0062889 A1 * | 3/2015 | Kika | F21K 9/17 362/223 |

* cited by examiner

LUMINAIRE LENS ASSEMBLY HAVING A THERMAL COMPENSATION UNIT AND METHOD THEREOF

CROSS-REFERENCE TO RELATED DOCUMENTS

None.

TECHNICAL FIELD

The present invention relates to a luminaire lens assembly. More specifically, the invention pertains to an elongate luminaire lens assembly having multiple lens segments and a thermal expansion compensation unit which maintains alignment of the lens segments and inhibits gaps from forming between the multiple lens segments.

BACKGROUND

Recessed luminaires and suspended luminaires are sometimes utilized in long runs for use in, for example, hallways or rooms having at least one dimension which is relatively lengthy. These lights may be formed with a lens assembly which may be of multiple pieces. Once the luminaire rises to a normal operating temperature, the lens material may flex and expand causing shifting of the lens within the luminaire housing. In turn, the shifting may result in gaps between pieces of the various lens. These gaps do not always close upon cooling of the luminaire. This provides for visible indication of lens seams between segments, which is highly undesirable. Repeated expansion, contraction and shifting when the lights are on or off exacerbates this problem.

Given the foregoing problems, with current luminaires, it would be highly desirable to overcome these and other deficiencies in these devices. More specifically, it would be highly desirable to provide a system which inhibits or eliminates gaps between lenses due to the thermal expansion and contraction of the housing or lens.

SUMMARY

A luminaire comprises at least one elongate luminaire housing, a plurality of lens segments extending through the at least one elongate luminaire housing, the lens segments having at least one edge which is cut on an angle, wherein an adjacent edge of adjacent lens segments form supplementary angles, at least one end constraint at ends of the plurality of elongate lens segments, at least one temperature compensation unit disposed between ends of the plurality of elongate lens segments. The luminaire wherein the at least one end constraint inhibits movement of one of the plurality of lens segments in at least a first direction. The luminaire wherein the at least one end constraint inhibits movement of one of the plurality of lens segments in two directions. The luminaire further comprising at least one longitudinal constraint on a longitudinal edge opposite an edge engaged by the temperature compensation unit. The luminaire wherein at least one lens segment of the plurality of lens segments is an intermediate lens. The luminaire wherein the intermediate lens segment is movable in a lateral direction based upon an operating temperature of the luminaire. The luminaire wherein the luminaire is a recessed luminaire or a suspended luminaire.

A luminaire comprises at least one luminaire housing, a first end lens segment, a second end lens segment and an intermediate lens segment disposed between the first and second lens segments, at least two of the first, second and intermediate lens segments having supplementary angled adjacent edges, a temperature compensating unit disposed along a longitudinal edge of at least one of the first, second and intermediate lens segment. The luminaire wherein the temperature compensating unit has an arched metal shim. The luminaire wherein the arched shim has a first normal position. The luminaire wherein the arched shim has a second heated position. The luminaire wherein one of the first normal position and the second heated position bears against at least one of the lens segments. The luminaire wherein the arched shim has a shape which varies based on a temperature of the luminaire. The luminaire wherein the end constraint limits motion in one direction. The luminaire wherein the end constraint limits motion in two directions. The luminaire further comprises a lateral constraint along a longitudinally extending edge of one of the first, second and intermediate lens. The luminaire wherein increasing temperature allows the intermediate lens segment to move laterally away from longitudinal alignment. The luminaire wherein decreasing temperature allows the intermediate lens segment to move laterally toward longitudinal alignment.

A luminaire, comprises a first fixed lens segment, a second constrained lens segment, a third intermediate lens segment between the first and second lens segments, a temperature compensating biasing spring engaging one of the lens segments, the temperature compensating biasing spring biasing at least one of the lens segments at a first temperature and decreasing the biasing force at a second temperature.

A method of maintaining alignment of lens segments of a lens assembly in a luminaire, comprises positioning a first end segment and a second end lens segment in a housing, positioning at least one intermediate lens segment in the housing, constraining the first and second end segments in at least one direction, and biasing one of the first, second and intermediate lens segments to maintain alignment of the lens segments, wherein the biasing is variable and based upon a temperature of the luminaire.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

A luminaire assembly having a thermal compensation unit is shown in the various FIGS. 1-8. The lens assembly includes a lengthy run of lens segments and the thermal compensation unit applies a biasing force to the lens assembly. This maintains alignment of the lens segments despite expansion and contraction of the lens assembly due to variation in temperature of the luminaire.

Figure 1:
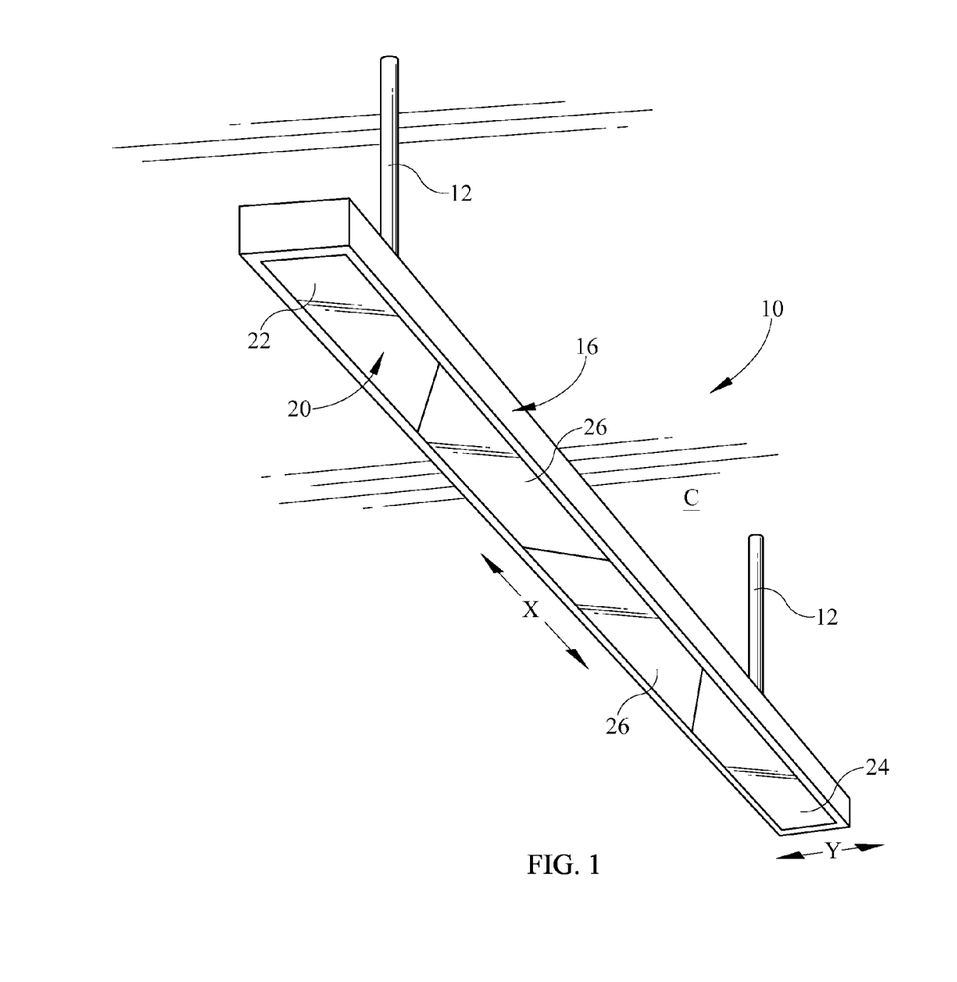
FIG. 1 depicts a perspective view of a suspended ceiling luminaire.

Referring initially to FIG. 1, a perspective view of a suspended luminaire fixture 10 is depicted. The suspended fixture includes one or more suspension members, for example rods or cables, 12 which are connected to or supporting a fixture housing 16. The fixture housing 16 may be formed of one or more housing segments and generally has a longitudinal length which is greater than a lateral or latitudinal length. The longitudinal and lateral directions are marked with an X and a Y, respectively for purpose of reference and illustration in this and further drawings herein. The luminaire fixture 10 has a longitudinal direction which is defined by distances of, for example, at least four feet but may be a shorter distance or may be a longer distance so as to extend through or illuminate long hallways or rooms having one or more long dimensions wherein these types of fixtures are typically utilized.

Figure 2:
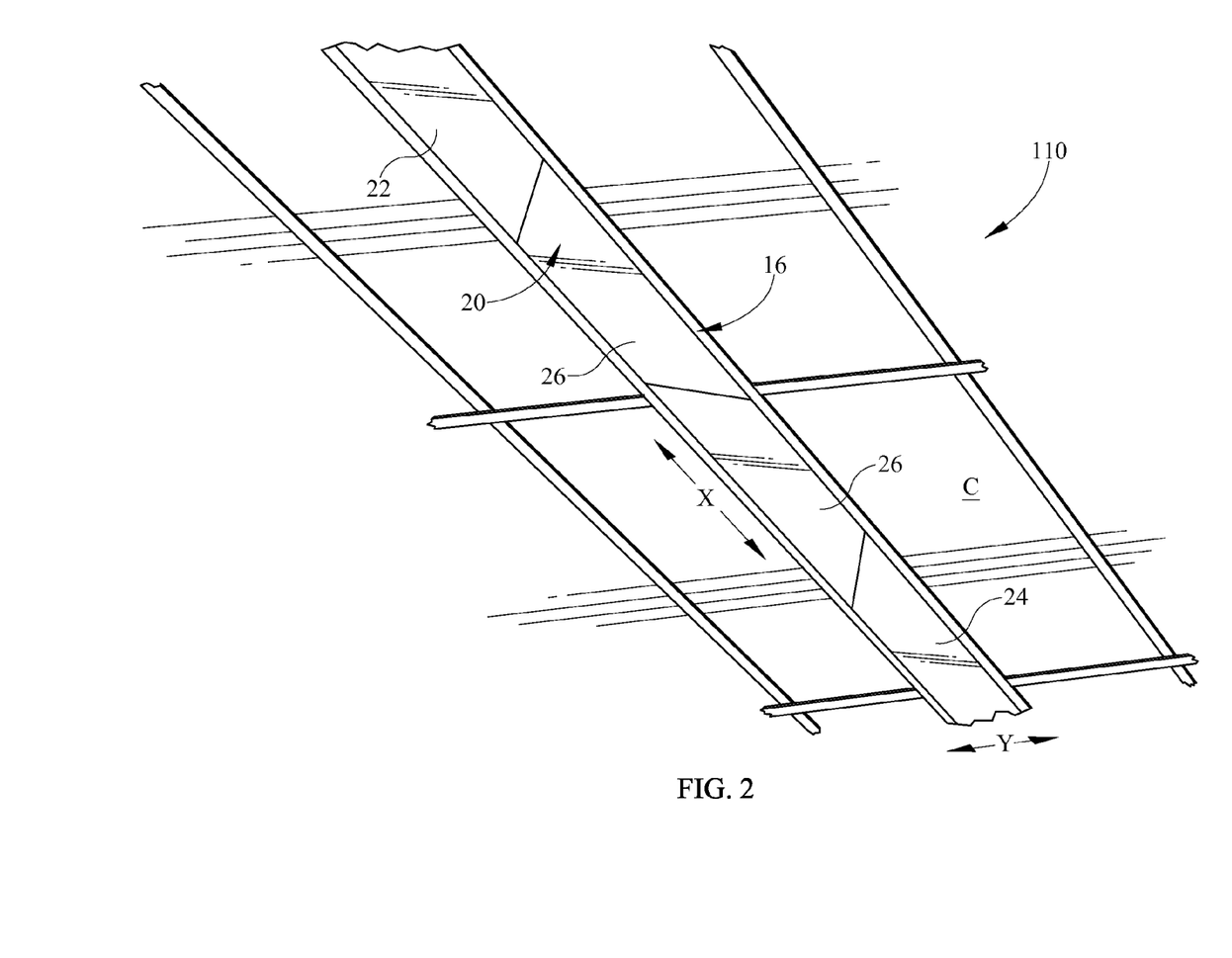
FIG. 2 depicts a perspective view of a recessed luminaire disposed within a ceiling.

Referring to FIG. 2 briefly, an alternate fixture type is depicted. For example, a recessed fixture 110 is depicted recessed within a ceiling C. The recessed fixture 110 may also have a housing 16 formed of one or more housing segments 22, 24, 26 having a longitudinal dimension X and lateral direction Y wherein the longitudinal direction is greater than the lateral or latitudinal direction.

The fixtures 10, 110 of FIGS. 1 and 2 both incorporate lens assemblies 20. These assemblies are defined by a plurality of lens segments. Each assembly includes a first end segment 22, a second end segment 24 and one or more intermediate segments 26. The lens assembly 20 is seated within the housing 16 so that the lens assembly 20 extends in the longitudinal direction X and generally is disposed near a light opening portion of the fixture 16. Additionally, according to either embodiment, the ceiling may be a fixed ceiling, such as one formed with drywall or may be a suspended grid ceiling. Although these lens segments are depicted as flat, they alternatively may have extruded profiles and additionally have various surface finishes.

Figure 3:
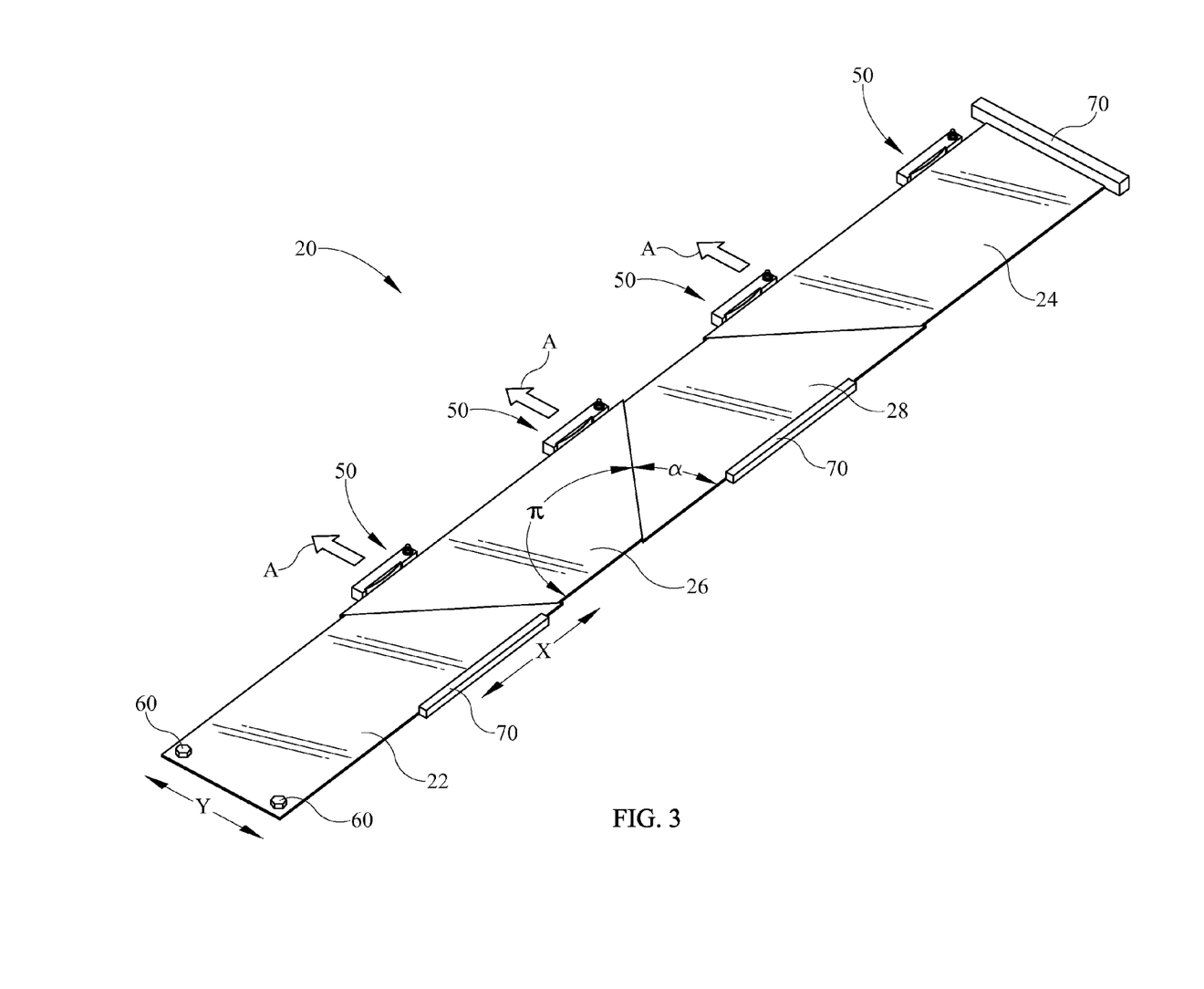
FIG. 3 depicts a perspective view of an exemplary lens assembly which may be utilized with the luminaires of the previous figures.

Referring now to FIG. 3, the lens assembly 20 is depicted in perspective view with the housing and other structure removed. The assembly 20 includes the first end segment 22, the second end segment 24, and first and second intermediate segments 26, 28. The intermediate segment 28 is labeled in FIG. 3 and further herein only for ease of reference and may be the same as segments 26 or alternatively may be sized differently. The lens assembly 20 includes two adjacently positioned thermal compensation units 50. The temperature compensation units 50 provide a first biasing force at a first temperature and a second biasing force at a second temperature on the various lens segments 22, 24, 26, 28 so that the lenses maintain alignment despite the temperature effects of expansion and shifting due to temperature differentials between an operating temperature and a luminaire off temperature. The first biasing force and second biasing force differ based on temperature of the luminaire and may be higher force at higher temperature or higher force at lower temperature as with the exemplary embodiment.

For example, when a luminaire is on, the temperature differential between an on light and an off light may be, as an exemplary number, thirty degrees Celsius. Over a four foot segment of polycarbonate based lens, the amount of expansion due to this temperature differential may be, for example, one and half millimeters. For a run of twenty four feet of luminaire assembly, this may be approximately, for example, seven millimeters of expansion or contraction. Over longer runs of luminaire, for example sixty feet, the compounded expansion of the luminaire assembly may be, for example, about twenty two millimeters. Alternatively, for an acrylic lens having a length of four feet, the expansion due to a temperature differential of thirty degrees Celsius may be, for example, about 2.5 millimeters (mm). Over a length of 60 feet, provided by 15 lens segments, the cumulative expansion may approach about thirty seven and one-half (37.5 mm) millimeters or nearly one and one-half (1.5") inches. This expansion and contraction, as previously discussed, may cause shifting of the luminaire in the housing since some clearance or tolerance may be built into the housing to compensate or allow for the expansion of the lens at operating temperature. One skilled in the art will understand that the expansion and contraction referred to herein are one problem of an existing lens structure. However, shifting is a second problem which is caused by the creeping or crawling of the lens relative to the housing during such shifting and contraction. This shifting results in undesirable gaps, as previously discussed, between lens segments.

In overcoming these problems, the lens segments 22, 24, 26, 28 are formed in polygon shapes, for example trapezoidal shapes as depicted in the exemplary embodiments. The segments may each have adjacent edges with supplementary angles π and α. According to the exemplary embodiment, the angles π and α are approximately one hundred and thirty five (135) degrees and forty five (45) degrees respectively. However, various angles may be utilized which are supplementary in nature and therefore the numbers provided should not be considered limiting. Alternatively, the angles may not be supplementary, but instead may be complementary or neither of these depending on the shape of the luminaire housing. In other words, the angle is not necessarily a limiting factor of the structure. The angled edges act as guides for the lens segments to slide relative to one another as they expend and contract.

Figure 8:
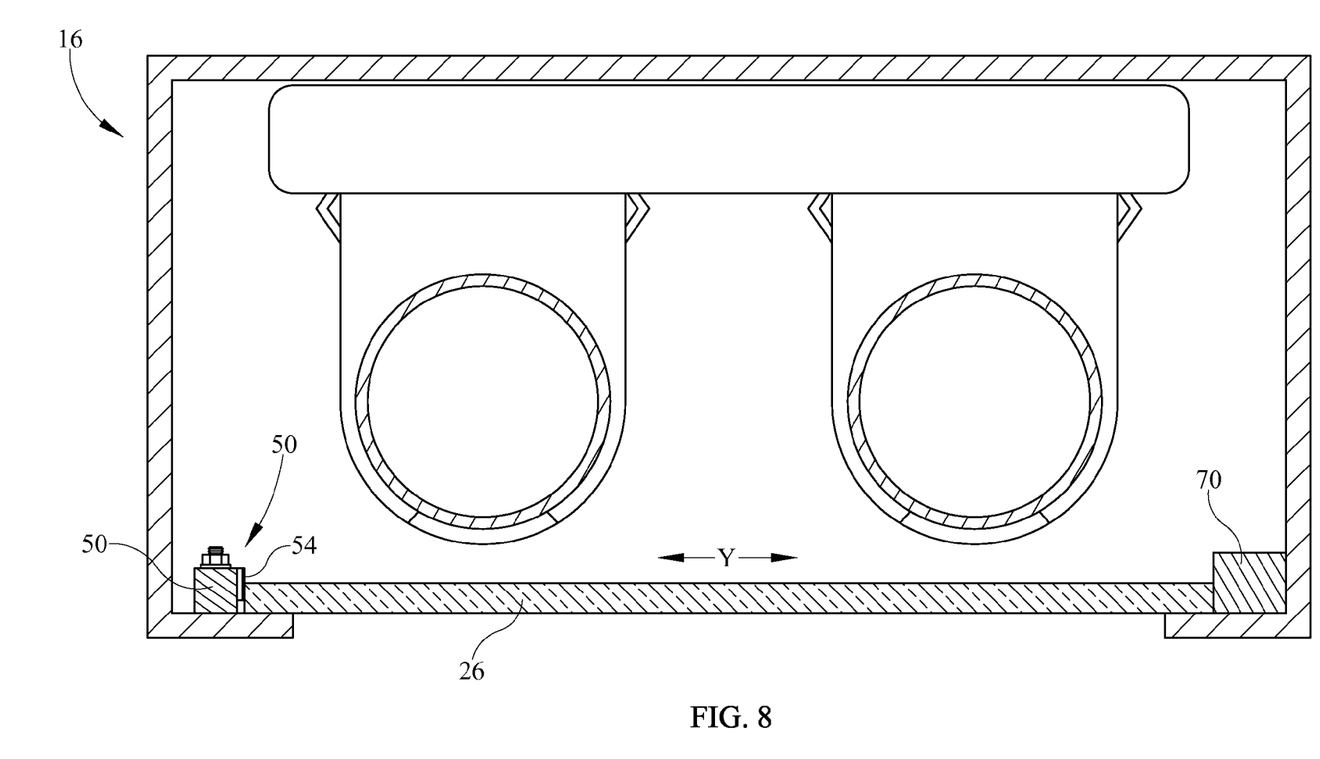
FIG. 8 is a section view of an exemplary fixture housing.

The lens assembly 20 is constrained at at least one end and at least one dimension. According to one exemplary embodiment, fix connections 60, for example fasteners, are utilized to constrain at least one of the end lens segments 22, 24 in both the longitudinal X direction and the lateral or latitudinal direction Y. However other structures besides the fasteners may be utilized. Additionally, the constraint may also be in a single dimension rather than two dimensions. For example, an edge, slot or other structure 70 within a housing may be used to constrain motion in a lateral direction but allow expansion and contraction in a longitudinal direction. An exemplary edge 70 is shown in FIG. 8 which allows translation in the Y direction but fixes the lens in the X direction.

The thermal compensation units 50 are shown disposed along at least one longitudinal edge of the lens assembly. The opposite longitudinal edge of the lens assembly may be constrained in a longitudinal direction by various structural features including, for example, an edge of the housing, slot or other such structural feature which limits movement in only one direction, the lateral direction as shown in FIG. 8. The thermal compensation units 50 provide a biasing force as previously described. In a cooler temperature condition, the exemplary structures provide a higher biasing force against the longer edges of the lens segments 24, 26 in a direction opposite the arrow A. However, upon heating, the thermal compensation unit 50 changes structurally to decrease the biasing force on the lens segments 24, 26 allowing movement of the lens in the direction of arrows A to compensate for heat induced expansion. Upon return to cooler temperatures, the biasing force against the lens segments increases in a direction opposite the arrows A to force the alignment of the lens segments in the longitudinal direction and inhibit gaps from forming in the lens assembly 20 at positions between the various lens segments 22, 24, 26, 28.

Although the compensation units 50 are shown engaging the long edges of the lens segments 24, 26 it should be understood that the units 50 may be alternatively placed on the opposite longitudinal edge and/or on the short edges of the lens segments. For example, the compensation units 50 of FIG. 3 are positioned on the opposite longitudinal edge from that shown in FIG. 4.

Figure 4:
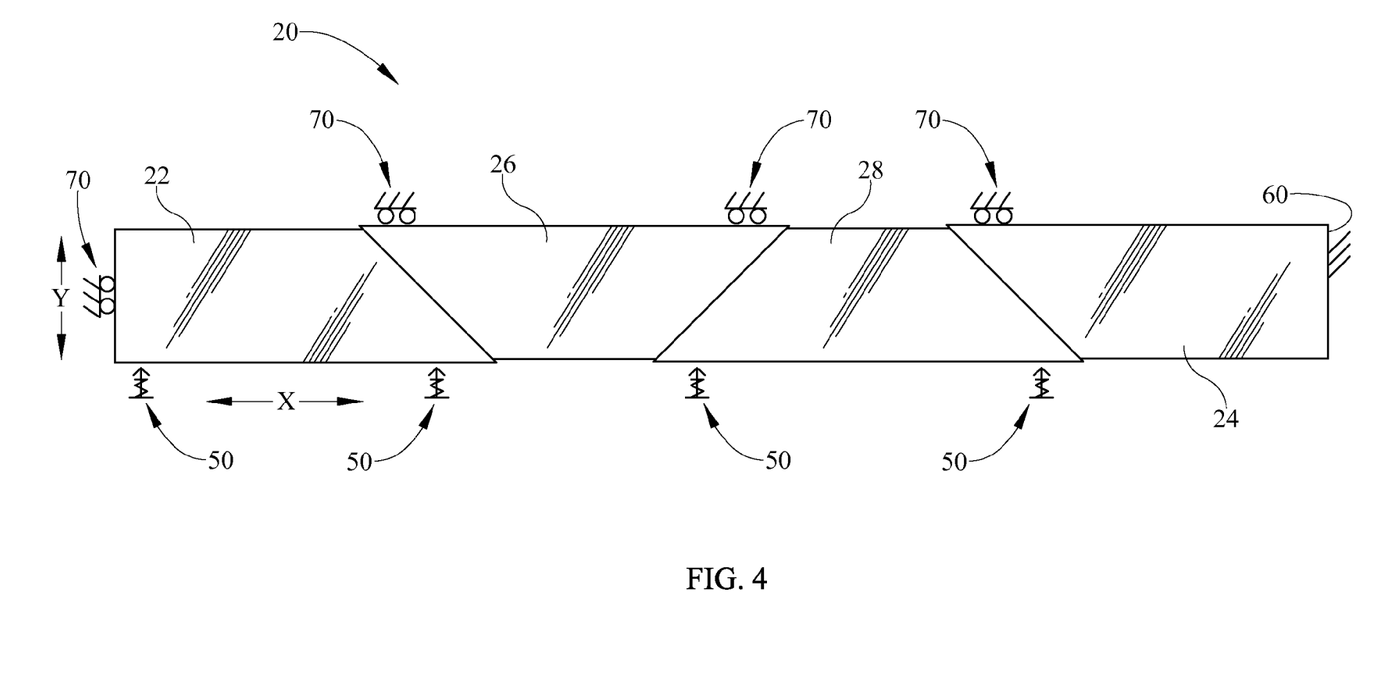
FIG. 4 depicts a schematic view of the lens assembly of FIG. 3.

Referring now to FIG. 4, a schematic view of an exemplary lens assembly 20 is depicted. The assembly 20 differs slightly from FIG. 3 in that the constraints are not fixed in both directions at both ends, but instead is fixed in one direction at one end and in two directions at a second end. Otherwise, this is an exemplary four lens segment assembly 20, like FIG. 3. As previously described, the compensation units 50 are shown on an opposite longitudinal edge of the assembly 20 and in differing locations. The lens assembly 20 of FIG. 4 includes the first end lens segment 22 and the second end lens segment 24. Along the lower longitudinal edge of assembly 20 are a plurality of thermal compensation units 50, shown schematically. Along the upper edge, an alternate constraint allows longitudinal translation but is fixed in a lateral Y direction so that the lens segments cannot move beyond a preselected position in the Y direction. Alternatively, the units 50 and the constraints 70 may be reversed about the longitudinal axis of the lens assembly 20. The first lens segment 22 is shown with a constraint 70 that allows translation in the Y direction. However, the second lens segment 24 is fixed in two directions and therefore does not allow translation at the right-hand end.

Figure 5:
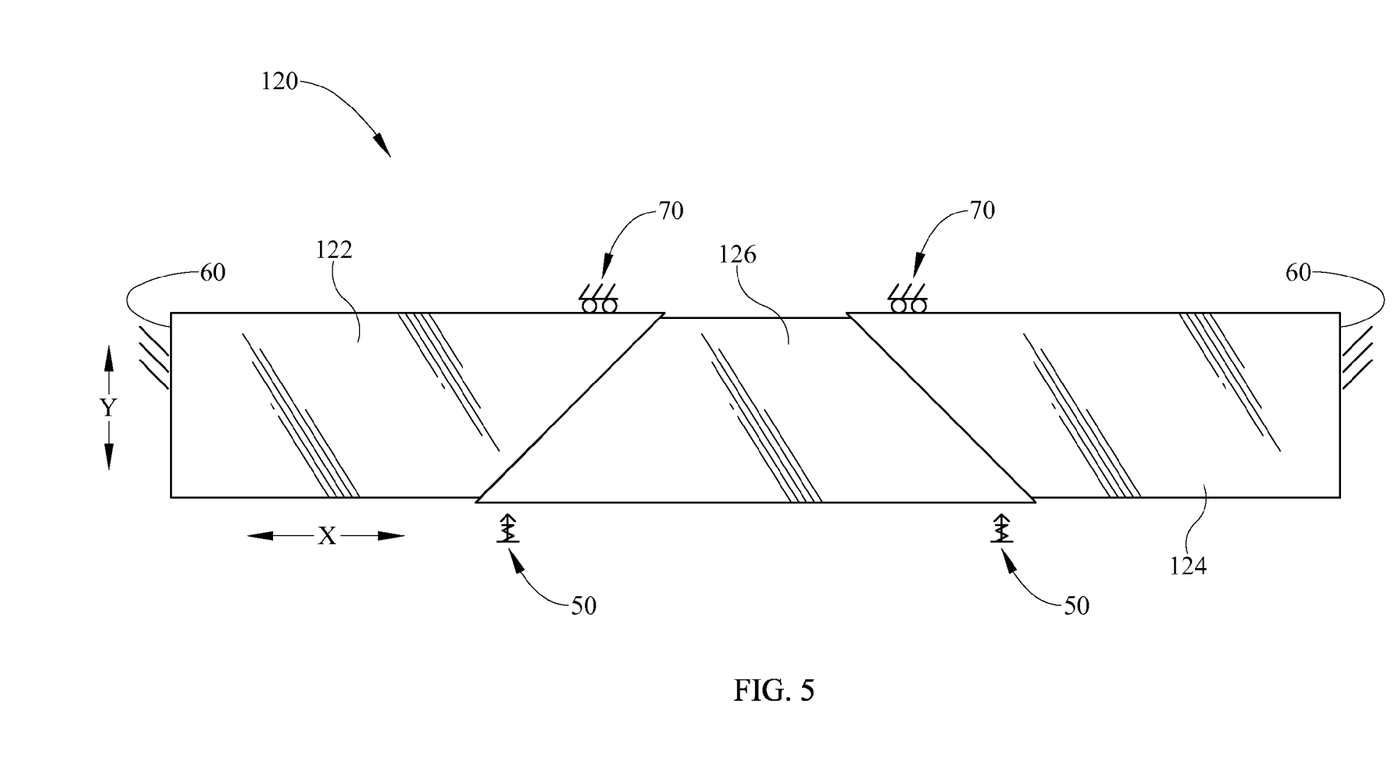
FIG. 5 depicts a schematic view of an alternate lens assembly.

Referring to FIG. 5, an alternative embodiment of the lens assembly 120 is depicted.

The lens assembly 120 includes a first end lens segment 122, a second end lens segment 124, and an intermediate lens segment 126. In the second exemplary embodiment, the lens assembly 120 utilizes fewer lens segments than the first embodiment. Additionally, the end segments 122, 124 are fixed in two directions while thermal compensation units 50 are utilized at ends of the intermediate segment 126. At ends of the segments 122, 124, opposite the fixed constraint or anchor, first and second translational constraints 70 are utilized to allow for expansion in a longitudinal direction while limiting movement in the lateral direction. It should be understood that the constraints 70 and units 50 may be reversed about a longitudinal axis of the assembly 120.

As one skilled in the art will recognize, the embodiments of FIGS. 4 and 5 have differing number of lens segments. To determine the number of segments needed, one needs to know the total length of the lens assembly and divide that total by the length of a single lens segment. Assuming these lens segments are of the same length, the number of segments needed will be provided by this calculation. If the resulting number of segments is an odd number, then the two end segment lens don't get a compensator and will be fixedly restrained in both the X and Y direction. If the resulting number of segments is an even number then one end segment lens will be restrained in X and Y and the second end segment lens will utilize compensation unit 50 and a restraint 70 in the X direction. As shown in the embodiments of FIGS. 4 and 5, one embodiment has four segments and the end segments utilize compensation units 50 whereas the other embodiment utilizes three lens segments wherein the end lens segments are fixed.

Figure 6:
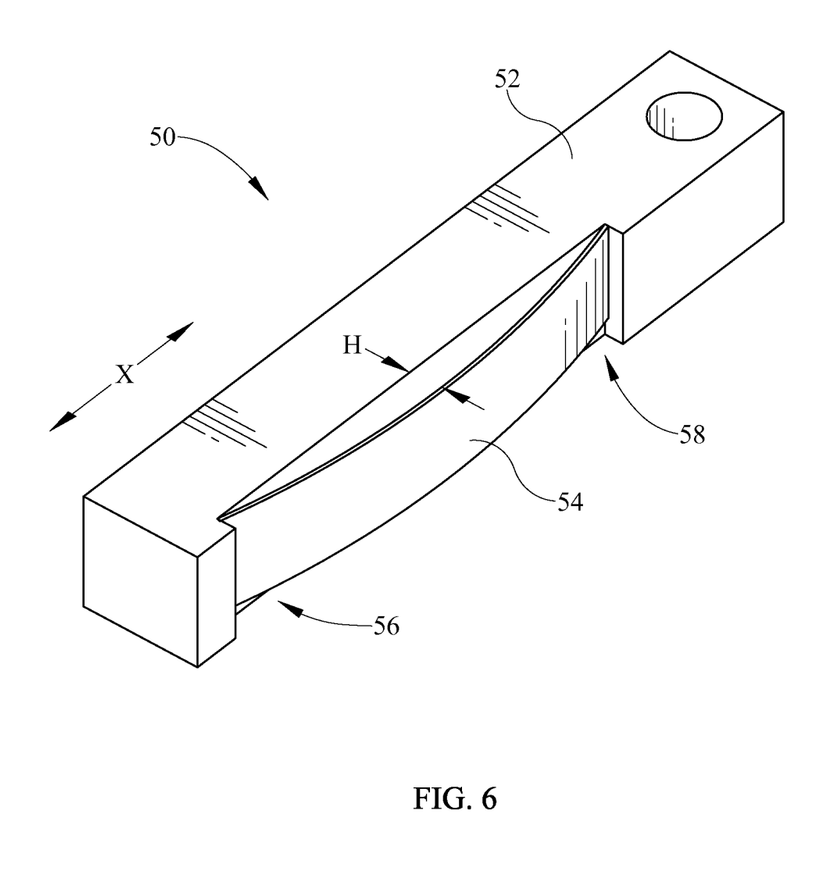
FIG. 6 depicts a perspective view of an exemplary thermal expansion unit.
Figure 7:
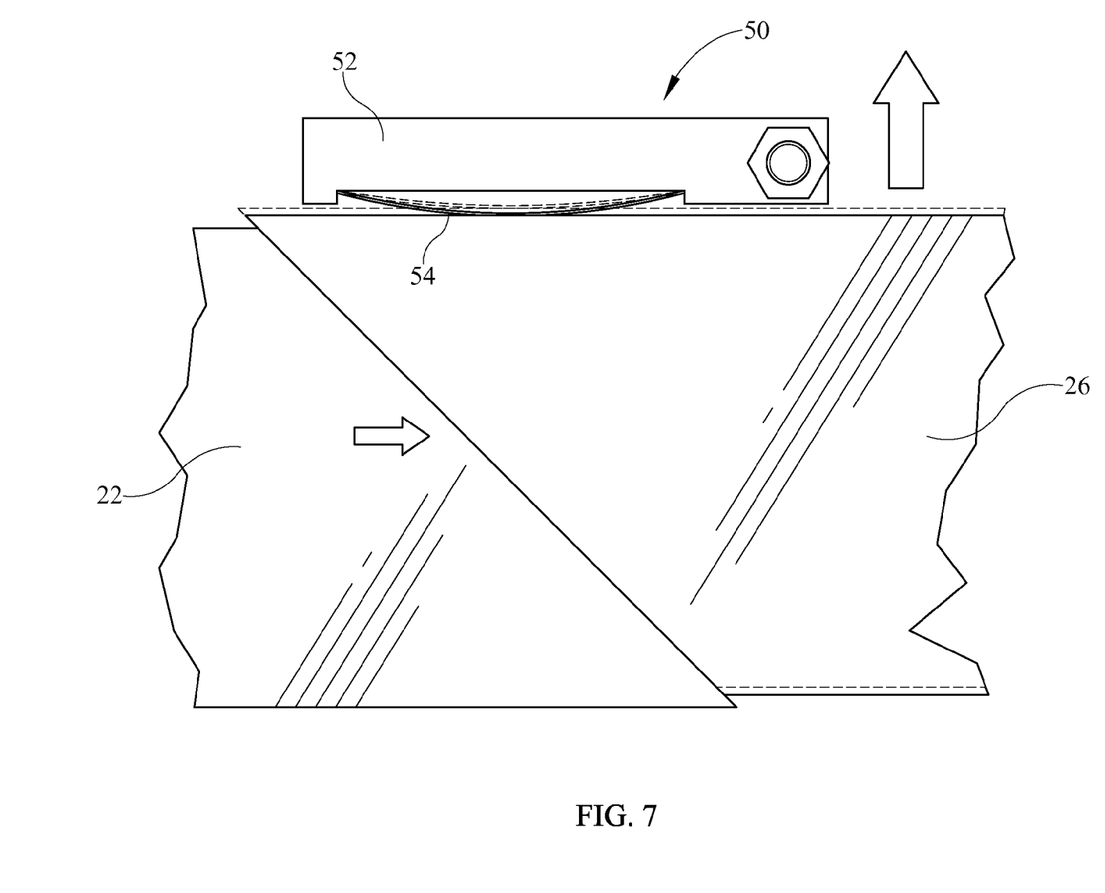
FIG. 7 depicts a bottom view of adjacent lens segments and their relative movement.

Referring now to FIG. 6, a temperature compensation unit 50 is depicted in a perspective view. The unit utilizes dissimilar materials in order to provide a predictable behavior to one of the materials which provides a biasing force against the lens assembly. For example, the temperature compensating unit 50 includes a ultra-high molecular weight (UHMW) plastic body and a metallic blade or shim 54 extending from a first position 56 to a second position 58 of the body 52. The blade 54 functions as a spring which engages the lens assembly 20 in order to provide a biasing force in a first position and temperature. Upon heating of the temperature compensating unit 50, the body 52 expands in the X direction at a rate that differs from the blade 54 rate of expansion. According to the exemplary embodiment, the body 52 expands faster than the rate of expansion of the metallic blade 54, for example steel, so that the height H of the blade arch 54 decreases upon heating. With reference to FIG. 7, it is shown in broken line in the heated position that the height of the arc, away from the body 52, is less than that which is shown in solid line. Accordingly, the lens structure 26 moves toward the temperature compensating body 52 during heating. When the luminaire is turned off and cooling occurs, the biasing force on the lens assembly 20 increases so that the lens segment 26 moves away from the compensating unit 50 as the adjacent lens segment 22 expands in a longitudinal direction. The temperature compensating unit may be fixed by various structures including fasteners, anchors, adhesives or other materials and structures whose function may not be adversely affected by the temperature increase and decrease consistent with lighting. Further, it should be understood that various biasing structures may be used alternatively to the shim or blade 54. For example, a coil spring may be utilized to bias and alternate shapes may be substituted for the body 52 to make such alternate spring or biasing structure operable. Any biasing structure or bi-material structure may be utilized which will provide a variable biasing force based on the change of temperature.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:
1. A luminaire, comprising:
  at least one elongated luminaire housing;
  a plurality of lens segments extending through said at least one elongated luminaire housing, said lens segments having at least one edge that is angled at a respective angle, wherein the angles of said at least one edge of adjacent lens segments are supplementary angles;

at least one end constraint at one or more ends of said plurality of lens segments for inhibiting movement of at least one segment of said plurality of lens segments in at least one direction; and at least one temperature compensation unit disposed between the ends of said plurality of lens segments, said temperature compensating unit having an arched metal shim and configured to move at least one lens segment of said plurality of lens segments toward alignment.

2. The luminaire of claim 1, wherein said at least one end constraint inhibits movement of said at least one segment in two directions.

3. The luminaire of claim 1, further comprising at least one longitudinal constraint on a longitudinal edge opposite an edge engaged by said temperature compensation unit.

4. The luminaire of claim 1, wherein at least one lens segment of said plurality of lens segments is an intermediate lens.

5. The luminaire of claim 4, wherein said intermediate lens segment is movable in a lateral direction based upon an operating temperature of said luminaire.

6. The luminaire of claim 1, wherein said luminaire is a recessed or a suspended luminaire.

7. The luminaire of claim 1, wherein said at least one edge is inclined at said respective angle.

8. The luminaire of claim 7, wherein said respective angle of said at least one edge is acute or obtuse.

9. The luminaire of claim, 1 wherein said shim is disposed within a body of the temperature compensation unit having a thermal expansion coefficient that is different from a thermal expansion coefficient of said shim.

10. The luminaire of claim 9, wherein the thermal expansion coefficient of the body is larger than the thermal expansion coefficient of said shim.

11. A luminaire comprising:

at least one luminaire housing;

a first end lens segment, a second end lens segment and an intermediate lens segment disposed between said first and second lens segments;

at least two of said first, second and intermediate lens segments having supplementary angled adjacent edges; and a temperature compensating unit disposed along a longitudinal edge of at least one of said first, second and intermediate lens segment, wherein, at increasing temperature, said intermediate lens segment moves laterally away from longitudinal alignment, or wherein, at decreasing temperature, said intermediate lens segment moves laterally toward longitudinal alignment.

12. The luminaire of claim 11, said temperature compensating unit having an arched metal shim.

13. The luminaire of claim 12, said arched shim having a first normal position.

14. The luminaire of claim 13, said arched shim having a second heated position.

15. The luminaire of claim 14, wherein one of said first normal position and said second heated position bears at least one of said lens segments.

16. The luminaire of claim 12, said arched shim having a shape which varies based on a temperature of said luminaire.

17. The luminaire of claim 11, wherein an end constraint limits motion in one direction.

18. The luminaire of claim 11, wherein an end constraint limits motion in two directions.

19. The luminaire of claim 11, further comprising a lateral constraint along a longitudinally extending edge of one of said first, second and intermediate lens.

* * * * *